(12) United States Patent
Son et al.

(10) Patent No.: US 10,131,820 B2
(45) Date of Patent: *Nov. 20, 2018

(54) PRESSURE-SENSITIVE ADHESIVE COMPOSITION

(71) Applicant: LG Chem, Ltd., Seoul (KR)

(72) Inventors: Sang Ha Son, Daejeon (KR); Sung Soo Yoon, Daejeon (KR); Kee Young Kim, Daejeon (KR); Jeong Sik Bae, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/309,946

(22) PCT Filed: Aug. 3, 2015

(86) PCT No.: PCT/KR2015/008092
§ 371 (c)(1),
(2) Date: Nov. 9, 2016

(87) PCT Pub. No.: WO2016/021895
PCT Pub. Date: Feb. 11, 2016

(65) Prior Publication Data
US 2017/0260423 A1    Sep. 14, 2017

(30) Foreign Application Priority Data

Aug. 4, 2014  (KR) .................. 10-2014-0099720

(51) Int. Cl.
| | | |
|---|---|---|
| B32B 7/12 | (2006.01) |
| C09J 7/38 | (2018.01) |
| C09J 133/08 | (2006.01) |
| C09J 133/14 | (2006.01) |
| C09J 133/26 | (2006.01) |
| C08K 3/017 | (2018.01) |
| C08F 220/18 | (2006.01) |
| C08F 220/28 | (2006.01) |
| C08F 220/56 | (2006.01) |
| C09J 4/06 | (2006.01) |
| C09J 133/06 | (2006.01) |
| C08F 220/26 | (2006.01) |
| C08F 265/10 | (2006.01) |

(52) U.S. Cl.
CPC ...................... *C09J 4/06* (2013.01);
*B32B 7/12* (2013.01); *C08F 220/26* (2013.01);
*C08F 220/56* (2013.01); *C08F 265/10*
(2013.01); *C08K 3/017* (2018.01); *C09J 7/385*
(2018.01); *C09J 133/066* (2013.01); *C09J
133/14* (2013.01); *C09J 133/26* (2013.01);
*B32B 2307/40* (2013.01); *B32B 2457/20*
(2013.01); *C08F 220/18* (2013.01); *C08F
2220/285* (2013.01); *C09J 133/08* (2013.01);
*C09J 2201/606* (2013.01); *C09J 2203/318*
(2013.01); *C09J 2205/102* (2013.01); *C09J
2433/00* (2013.01); *C09J 2467/006* (2013.01)

(58) Field of Classification Search
None
See application file for complete search history.

(56) References Cited

U.S. PATENT DOCUMENTS

| | | | |
|---|---|---|---|
| 3,897,295 A | | 7/1975 | Dowbenko et al. |
| 5,322,861 A | * | 6/1994 | Tsuge .................... C08G 18/10 522/174 |

(Continued)

FOREIGN PATENT DOCUMENTS

| | | |
|---|---|---|
| JP | H05140519 A | 6/1993 |
| JP | 2008248223 A | 10/2008 |
| JP | 2011099078 A | 5/2011 |
| JP | 2012041456 A | 3/2012 |
| JP | 2012196953 A | 10/2012 |
| JP | 2012242473 A | 12/2012 |
| JP | 2014001331 A | 1/2014 |
| JP | 2018123330 A | 8/2018 |
| KR | 20040030919 A | 4/2004 |
| KR | 20060128659 A | 12/2006 |
| KR | 20080008813 A | 1/2008 |

(Continued)

OTHER PUBLICATIONS

International Search Report from PCT/KR2015/008092, dated Sep. 25, 2015.

(Continued)

*Primary Examiner* — Frank D Ducheneaux
(74) *Attorney, Agent, or Firm* — Lerner, David, Littenberg, Krumholz & Mentlik, LLP

(57) ABSTRACT

The present invention relates to a pressure-sensitive adhesive composition, a protective film, an optical element, and a display device. A pressure-sensitive adhesive sheet formed using the pressure-sensitive adhesive composition according to the present invention can have proper high-speed and low-speed peel strengths and simultaneously can exhibit an excellent balance between the high-speed and low-speed peel strengths. The pressure-sensitive adhesive sheet formed using the pressure-sensitive adhesive composition according to one exemplary embodiment of the present invention exhibits a proper level of surface resistance and excellent electrostatic discharge characteristics, and has no contaminants with respect to an adherend even when the pressure-sensitive adhesive sheet is peeled from the adherend after the pressure-sensitive adhesive sheet is attached to the adherend for a long period of time. Such a pressure-sensitive adhesive sheet formed using the pressure-sensitive adhesive composition according to one exemplary embodiment of the present invention can be applied to various fields of applications. For example, the pressure-sensitive adhesive sheet can be used as a protective film for optical members such as polarizing plates.

12 Claims, No Drawings

(56) References Cited

U.S. PATENT DOCUMENTS

| | | | |
|---|---|---|---|
| 5,508,313 A | 4/1996 | Delgado et al. | |
| 2009/0317635 A1* | 12/2009 | Amano | C09J 7/0217 |
| | | | 428/355 AC |
| 2010/0068420 A1 | 3/2010 | Kim et al. | |
| 2011/0112249 A1 | 5/2011 | Takarada et al. | |
| 2013/0085215 A1* | 4/2013 | Shitara | C09J 7/0217 |
| | | | 524/100 |
| 2013/0211028 A1 | 8/2013 | Shinike et al. | |
| 2014/0073733 A1 | 3/2014 | Yokokura et al. | |
| 2014/0220264 A1 | 8/2014 | Park et al. | |
| 2015/0093533 A1 | 4/2015 | Kim et al. | |
| 2015/0099114 A1 | 4/2015 | Kim et al. | |

FOREIGN PATENT DOCUMENTS

| | | |
|---|---|---|
| KR | 20130072180 A | 7/2013 |
| KR | 20140147750 A | 12/2014 |
| KR | 20140147764 A | 12/2014 |
| WO | 2013095064 A1 | 6/2013 |

OTHER PUBLICATIONS

Supplementary European Search Report for Application No. EP15830487.3 dated Oct. 26, 2017.

\* cited by examiner

PRESSURE-SENSITIVE ADHESIVE COMPOSITION

CROSS-REFERENCE TO RELATED APPLICATIONS

This application is a national phase entry under 35 U.S.C. § 371 of International Application No. PCT/KR2015/008092, filed Aug. 3, 2015, which claims priority to Korean Patent Application No. 10-2014-0099720, filed Aug. 4, 2014, the disclosures of which are incorporated herein by reference.

TECHNICAL FIELD

The present invention relates to a pressure-sensitive adhesive composition, a film for protecting an optical element, an optical element, and a display device.

BACKGROUND ART

Protective films may be used to prevent filth such as dust from being attached to optical elements such as polarizing plates, other plastic products, home appliances, or automobiles, or to prevent occurrence of scratches. The protective films require proper peel strength and antistatic characteristics.

For example, when a protective film is rapidly peeled off for the purpose of use of products or assembly of other products, the protective film has to require relatively low peel strength (hereinafter referred to as "high-speed peel strength"). On the other hand, when the protective film is slowly peeled off, the protective film has to require relatively high peel strength (hereinafter referred to as "low-speed peel strength") so as to exhibit a proper protective function.

Also, foreign substances such as dust may be generally absorbed by static electricity occurring during peeling of the protective film, or devices may be electrostatically damaged or malfunctions may be triggered in electronic products. In particular, the problems regarding the static electricity are being increasingly issued with the propagation of computers, and the integration of parts by multifunctionalization of liquid crystal TVs or mobile phones.

Therefore, many attempts have been conducted to give an antistatic function to a pressure-sensitive adhesive included in the protective film.

For example, Patent Document 1 discloses that an ethylene oxide-modified dioctyl phthalate plasticizer is blended with a pressure-sensitive adhesive to suppress the occurrence of static electricity. Also, Patent Document 2 discloses that an organic salt is added to a pressure-sensitive adhesive, and Patent Document 3 discloses that a metal salt and a chelating agent are mixed with a pressure-sensitive adhesive. However, the methods have problems in that contamination may occur by the transfer of pressure-sensitive adhesive components to products protected by the protective film, it may be difficult to prevent static electricity from occurring at the beginning, and, especially, the low-speed peel strength important for the protective function may be extremely low.

PRIOR-ART DOCUMENT

Patent Document

Patent Document 1: Japanese Unexamined Patent Laid-open Publication No. 1993-140519

Patent Document 2: Korean Unexamined Patent Application Publication No. 2004-0030919

Patent Document 3: Korean Unexamined Patent Application Publication No. 2006-0128659

DISCLOSURE

Technical Problem

The present invention is directed to providing a pressure-sensitive adhesive composition, a film for protecting an optical element, an optical element, and a display device. A pressure-sensitive adhesive sheet formed using the pressure-sensitive adhesive composition according to one exemplary embodiment of the present invention may have proper high-speed and low-speed peel strengths and simultaneously may exhibit an excellent balance between the high-speed and low-speed peel strengths. The pressure-sensitive adhesive sheet formed using the pressure-sensitive adhesive composition according to one exemplary embodiment of the present invention exhibits a proper level of surface resistance and excellent electrostatic discharge characteristics, and has no contaminants with respect to an adherend even when the pressure-sensitive adhesive sheet is peeled from the adherend after the pressure-sensitive adhesive sheet is attached to the adherend for a long period of time. Such a pressure-sensitive adhesive sheet formed using the pressure-sensitive adhesive composition according to one exemplary embodiment of the present invention may be applied to various fields of applications. For example, the pressure-sensitive adhesive sheet may be used as a protective film for optical members such as polarizing plates.

Technical Solution

A pressure-sensitive adhesive composition according to one exemplary embodiment may include a polymer, and an ionic compound. The polymer may include a monomer having an alkylene oxide chain, a nitrogen-containing reactive compound, and a hydroxyl group-containing monomer as monomer components to exhibit proper pressure-sensitive adhesive performance, antistatic performance, and peeling properties. In this specification, the term "monomer" refers to all types of compounds which can form polymers by means of a polymerization reaction. Also, the expression "polymer including a certain monomer as a monomer component" may mean that the certain monomer is polymerized to form side chains or the main chain of a polymer. Unless particularly defined otherwise in this specification, the expression "polymer including, comprising, or having a certain monomer" may mean that the polymer includes, comprises, or has a certain monomer as a polymerization unit.

Examples of the monomer having the alkylene oxide chain may, for example, include a compound represented by Formula 1.

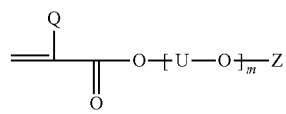

[Formula 1]

In Formula 1, Q represents hydrogen or an alkyl group, U represents an alkylene group, Z represents hydrogen, an alkyl group, or an aryl group, m is an arbitrary number, for example, a number ranging from 1 to 2.

When two or more units [—U—O—] are present in Formula 1, the number of carbon atoms of U in each of the units may be the same or different.

In Formula 1, m may be a number ranging from 1 to 2. Within this range, polymerization efficiency and crystallinity of the polymer can be maintained properly upon preparation of the polymer, and the pressure-sensitive adhesive can be provided with proper conductivity. In particular, an effect of preventing contamination of an adherend may be maximized within this range.

Unless particularly defined otherwise in this specification, the term "alkyl group" may refer to an alkyl group having 1 to 20 carbon atoms, 1 to 16 carbon atoms, 1 to 12 carbon atoms, 1 to 8 carbon atoms, or 1 to 4 carbon atoms. The alkyl group may be linear, branched, or cyclic. The alkyl group may be unsubstituted or substituted with one or more substituents.

Unless particularly defined otherwise in this specification, the term "alkylene group" or "alkylidene group" may refer to an alkylene group or an alkylidene group having 1 to 20 carbon atoms, 1 to 16 carbon atoms, 1 to 12 carbon atoms, 1 to 8 carbon atoms, or 1 to 4 carbon atoms. The alkylene group or the alkylidene group may be linear, branched, or cyclic. The alkylene group or the alkylidene group may be substituted with one or more substituents, when necessary.

In Formula 1, Q may be an alkyl group, for example, an alkyl group having 1 to 8 carbon atoms, or 1 to 4 carbon atoms according to another exemplary embodiment. When a compound such as an alkyl group is used as Q, for example, when the pressure-sensitive adhesive composition is applied to a protective film, and the like, the protective film may be easily removed from the adherend without any residual substances or stains.

Unless particularly defined otherwise in this specification, the term "aryl group" may refers to a monovalent residue derived from a compound or a derivative thereof, which includes a benzene ring or has a structure in which two or more benzene rings are joined together or in which two or more benzene rings are condensed or joined together while sharing one or two or more carbon atoms. The aryl group may be, for example, an aryl group having 6 to 25 carbon atoms, 6 to 22 carbon atoms, 6 to 16 carbon atoms, or 6 to 13 carbon atoms. Examples of such an aryl group may include a phenyl group, a phenylethyl group, a phenylpropyl group, a benzyl group, a tolyl group, a xylyl group, or a naphthyl group.

In this specification, examples of the substituent that may be substituted for a certain functional group, for example, an alkyl group, an alkylidene group, or an alkylene group may include an alkyl group, an alkoxy group, an alkenyl group, an epoxy group, a cyano group, a carboxyl group, an acryloyl group, a methacryloyl group, an acryloyloxy group, a methacryloyloxy group, or an aryl group, but the present invention is not limited thereto.

Examples of the compound of Formula 1 may include alkoxyalkoxyalkyl (meth)acrylate, etc. As such, examples of the alkoxy may, for example, include an alkoxy having 1 to 20 carbon atoms, 1 to 16 carbon atoms, 1 to 12 carbon atoms, or 1 to 4 carbon atoms. Specifically, examples of the alkoxy may include a methoxy group, or an ethoxy group.

Types of the nitrogen-containing reactive compound, which may be included in the polymer, are not particularly limited. In this specification, the term "nitrogen-containing reactive compound" may refer to a compound containing at least one nitrogen atom and having reactivity to polymerize other monomers used to form polymers. For example, an amide group-containing monomer, an amino group-containing monomer, an imide group-containing monomer, or a cyano group-containing monomer may be used as the compound. As such, examples of the amide group-containing monomer may, for example, include (meth)acrylamide or N,N-dimethyl (meth)acrylamide, N,N-diethyl (meth)acrylamide, N-isopropyl (meth)acrylamide, N-methylol (meth) acrylamide, diacetone (meth)acrylamide, N-vinylacetamide, N,N'-methylene bis(meth)acrylamide, N,N-dimethylaminopropyl (meth)acrylamide, N,N-dimethylaminopropyl methacrylamide, N-vinylpyrrolidone, N-vinylcaprolactam, or (meth)acryloyl morpholine, examples of the amino group-containing monomer may include aminoethyl (meth)acrylate, N,N-dimethylaminoethyl (meth)acrylate, or N,N-dimethylaminopropyl (meth)acrylate, examples of the imide group-containing monomer may include N-isopropylmaleimide, N-cyclohexylmaleimide, or itaconimide, and examples of the cyano group-containing monomer may include acrylonitrile, or methacrylonitrile, but the present invention is not limited thereto. Among theses, N,N-dialkyl (meth)acrylamide may be particularly used as the nitrogen-containing reactive compound to ensure superior peeling properties, for example, a balance between low-speed and high-speed peel strengths, as well as proper physical properties, for example, conductivity and to maximize an effect of preventing contamination of the adherend. In this case, the N,N-dialkyl (meth)acrylamide may contain an alkyl group having 1 to 20 carbon atoms, 1 to 16 carbon atoms, 1 to 12 carbon atoms, 1 to 8 carbon atoms, or 1 to 4 carbon atoms.

Also, the polymer may further include a hydroxyl group-containing monomer. The monomer may provide the polymer with a hydroxyl group.

Examples of the hydroxyl group-containing monomer may, for example, include a monomer represented by Formula 2.

[Formula 2]

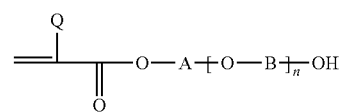

In Formula 2, Q represents hydrogen or an alkyl group, A and B each independently represent an alkylene group, n is an arbitrary number, for example, a number ranging from 0 to 10.

When two or more units [—U—O—] are present in Formula 1, the number of carbon atoms of U in each of the units may be the same or different.

For example, A and B in Formula 2 may each independently represent a linear alkylene group.

Examples of the compound of Formula 2 may include 2-hydroxyethyl (meth)acrylate, 2-hydroxypropyl (meth) acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, or 2-hydroxypropylene glycol (meth)acrylate, but the present invention is not limited thereto.

According to one exemplary embodiment, two monomers having different carbon atoms present in the side chains may be used as the hydroxyl group-containing monomer.

For example, the polymer may include a polymerization unit of a first monomer, which is represented by Formula 2 and in which each of alkylene groups present in A and B of Formula 2 has 1 to 3 carbon atoms, and a polymerization unit of a second monomer, which is represented by Formula 2 and in which each of the alkylene groups present in A and B of Formula 2 has 4 to 20 carbon atoms, 4 to 16 carbon atoms, 4 to 12 carbon atoms, 4 to 8 carbon atoms, or 4 to 6 carbon atoms.

When the number of the carbon atoms is calculated as described above, the number of the carbon atoms of the alkylene groups present in a liner form is considered so as to differentiate the first and second monomers. For example, when A and B are substituted with a substituent containing carbon atoms, the carbon atoms of the substituent are not taken into consideration. As described above, the pressure-sensitive adhesive having very excellent peel strength characteristics, that is, a balance between high-speed and low-speed peel strengths may be provided due to the polymerization units of the two hydroxyl group-containing monomers. Also, the pressure-sensitive adhesive composition capable of reducing contamination of the adherend under the proper control of ratios of the monomers may be provided.

To ensure superior peeling properties, for example, a balance between low-speed and high-speed peel strengths, as well as proper physical properties such as pressure-sensitive adhesive performance, a ratio of weights of the first and second monomers in the polymer may be adjusted. For example, a weight ratio (A/B) of the weight (A) of the first monomer to the weight (B) of the second monomer in the polymer may be greater than or equal to 1 or greater than 1. According to another exemplary embodiment, the weight ratio may be greater than or equal to approximately 1.1 or approximately 1.2. According to still another exemplary embodiment, the weight ratio may be less than or equal to approximately 25, approximately 20, approximately 15, approximately 10, approximately 8, or approximately 5. Within this ratio range, the pressure-sensitive adhesive, which exhibits proper antistatic performance and simultaneously has a proper balance between high-speed and low-speed peel strengths without leaving contaminants behind upon peeling, may be provided.

The polymer may include the monomer of Formula 1 at 0.1 to 5 parts by weight, the polymerization unit of the nitrogen-containing reactive compound at 1 to 30 parts by weight, the first monomer at 0.1 to 15 parts by weight, and the second monomer at 0.1 to 5 parts by weight as monomer components. Unless particularly defined otherwise in this specification, the unit "part(s) by weight" may refer to a weight ratio between the respective components. For example, the expression "the polymer including the monomer of Formula 1 at 0.1 to 5 parts by weight, the nitrogen-containing reactive compound at 1 to 30 parts by weight, the first monomer at 0.1 to 15 parts by weight, and the second monomer at 0.1 to 5 parts by weight as the monomer components" as described above may mean that the polymer is formed from a mixture of monomers including the respective monomers so that a weight ratio (A:B:C:D) of the weight (A) of the monomer of Formula 1, the weight (B) of the nitrogen-containing reactive compound, the weight (C) of the first monomer, and the weight (D) of the second monomer can be "0.1 to 5:1 to 30:0.1 to 15:0.1 to 5." According to another exemplary embodiment, the monomer of Formula 1 may be included at a content of approximately 0.5 to 5 parts by weight, approximately 1 to 5 parts by weight, approximately 1.5 to 5 parts by weight, approximately 2 to 5 parts by weight, approximately 2.5 to 5 parts by weight, approximately 3 to 5 parts by weight, or approximately 3.5 to 5 parts by weight. Also, the nitrogen-containing reactive monomer may be included at a content of approximately 1 to 27 parts by weight, approximately 2 to 27 parts by weight, approximately 2.5 to 27 parts by weight, approximately 3 to 27 parts by weight, approximately 3.5 to 27 parts by weight, approximately 1 to 20 parts by weight, approximately 1 to 15 parts by weight, approximately 1 to 10 parts by weight, or approximately 1 to 7 parts by weight. According to still another exemplary embodiment, the first monomer may also be included at a content of approximately 0.5 to 15 parts by weight, approximately 1 to 15 parts by weight, approximately 1.5 to 15 parts by weight, approximately 2 to 15 parts by weight, approximately 2.5 to 15 parts by weight, approximately 2.5 to 14 parts by weight, approximately 2.5 to 13 parts by weight, or approximately 1 to 10 parts by weight. According to yet another exemplary embodiment, the second monomer may be included at a content of approximately 1 to 5 parts by weight, approximately 1.5 to 5 parts by weight, approximately 2 to 5 parts by weight, approximately 2.5 to 5 parts by weight, approximately 2.5 to 4.5 parts by weight, approximately 2.5 to 4 parts by weight, or approximately 2.5 to 3.5 parts by weight. Within these ratios of the monomers, the pressure-sensitive adhesive composition having proper high-speed and low-speed peel strengths and simultaneously exhibiting an excellent balance between the high-speed and low-speed peel strengths may be provided. In addition, when the polymer is used, the pressure-sensitive adhesive composition, which exhibits a proper level of surface resistance and excellent electrostatic discharge characteristics and has no contaminants with respect to an adherend even when the pressure-sensitive adhesive composition is peeled from the adherend after the pressure-sensitive adhesive composition is attached to the adherend for a long period of time, may be provided. In the polymer, a weight ratio (E) of the monomer of Formula 1, and a weight ratio (N) of the nitrogen-containing reactive compound may be further adjusted, when necessary. For example, a weight ratio (N/E) may be adjusted within approximately 0.1 to 10, approximately 0.1 to 9, approximately 0.1 to 8, approximately 0.1 to 7, approximately 0.1 to 6, approximately 0.1 to 5, approximately 0.1 to 4, approximately 0.1 to 3, approximately 0.5 to 3, or approximately 0.5 to 2.

Also, the polymer may further include a polymerization unit of a (meth)acrylic acid ester monomer, for example, an alkyl (meth)acrylate. For example, an alkyl (meth)acrylate including an alkyl group having 1 to 14 carbon atoms may be used as the alkyl (meth)acrylate in consideration of cohesiveness, glass transition temperature, or pressure-sensitive adhesiveness of the pressure-sensitive adhesive. Examples of such a monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate. Among these, one or two or more of the monomers may be included in the polymer as a polymerization unit.

The polymer may, for example, include the polymerization unit of the (meth)acrylic acid ester monomer at 65 parts by weight to 99 parts by weight, or 70 parts by weight to 90 parts by weight. For example, the weight ratio may vary in consideration of specific types of the respective monomers, when necessary.

The polymer may further include a known monomer used to prepare a polymer for pressure-sensitive adhesives, for example, a carboxyl group-containing monomer such as (meth)acrylic acid, 2-(meth)acryloyloxy acetic acid, 3-(meth)acryloyloxy propylic acid, 4-(meth)acryloyloxy butyric acid, an acrylic acid dimer, itconic acid, maleic acid, and a maleic acid anhydride; a monomer containing an isocyanate group; a monomer containing a glycidyl group, such as glycidyl (meth)acrylate; a radical-polymerizable monomer containing nitrogen atoms, such as (meth)acrylamide, N-vinyl pyrrolidone, or N-vinyl caprolactam; or a radical-polymerizable monomer such as styrene, when necessary. Such monomers may be polymerized to be included in the polymer. For example, the monomers may be included in the polymer at a content of approximately 20 parts by weight or less.

The polymer may be prepared by selecting the requisite monomers from the above-described monomers, mixing the selected monomers at desired ratios to prepare a mixture of the monomers and subjecting the mixture of the monomers to a polymerization method such as solution polymerization, photo-polymerization, bulk polymerization, suspension polymerization, or emulsion polymerization.

The pressure-sensitive adhesive composition may include a photostabilizer, for example, a photostabilizer such as a hindered amine compound. For example, since the pressure-sensitive adhesive is not condensed even when the pressure-sensitive adhesive is kept under a high-temperature condition, such a photostabilizer serves not to cause an increase in concentration of an antistatic agent to be described below in condensed clusters. Also, the photostabilizer may serve to prevent radicals from being formed when ether binding sites of alkylene oxide chains included in the polymer are degraded by heat, or prevent the hydroxyl group-containing monomer from resulting in a condensation reaction. As a result, storage stability of the pressure-sensitive adhesive composition may be highly improved.

Examples of the photostabilizer may, for example, include a compound represented by Formula 3.

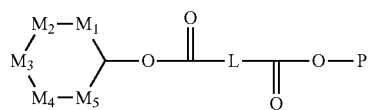

[Formula 3]

In Formula 3, $M_1$ to $M_5$ each independently represent $R^1$—N, $(R^2)(R^3)$—C, or $(R^4)(R^5)$—C where $R^1$ represents hydrogen, an alkyl group, or an alkoxy group, $R^2$ and $R^3$ each independently represent an alkyl group, and $R^4$ and $R^5$ each independently represent hydrogen or an alkyl group, L represents an alkylene group or an alkylidene group, and P represents an alkyl group or a substituent represented by Formula 4. In Formula 3, at least one of $M_2$ to $M_4$ may be $R^1$—N, and $M_1$, $M_2$, $M_3$, $M_4$ or $M_5$ present directly adjacent to $M_2$, $M_3$ or $M_4$ that is $R^1$—N may be $(R^2)(R^3)$—C.

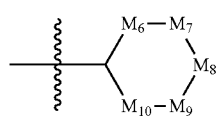

[Formula 4]

In Formula 4, $M_6$ to $M_{10}$ each independently represent $R^1$—N, $(R^2)(R^3)$—C, or $(R^4)(R^5)$—C where $R^1$ represents hydrogen, an alkyl group, or an alkoxy group, $R^2$ and $R^3$ each independently represents an alkyl group, and $R^4$ and $R^5$ each independently represent hydrogen or an alkyl group. In Formula 4, at least one of $M_7$ to $M_9$ may be $R^1$—N, and $M_6$, $M_7$, $M_8$, $M_9$ or $M_{10}$ present directly adjacent to $M_7$, $M_8$ or $M_9$ that is $R^1$—N may be $(R^2)(R^3)$—C.

In Formulas 3 and 4, the expression "$M_1$ to $M_{10}$ being $R^1$—N, $(R^2)(R^3)$—C or $(R^4)(R^5)$—C" may mean that nitrogen atoms (N) or carbon atoms (C) are present at positions of $M_1$ to $M_{10}$, and the substituents such as $R^1$ to $R^5$ are bound to the nitrogen atoms or the carbon atoms.

In Formula 4, the symbol

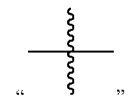

means that a carbon atom in Formula 4 bound to the symbol is bound to an oxygen atom in Formula 3.

In Formula 3, L representing an alkylene group or an alkylidene group may be substituted or unsubstituted, when necessary. For example, L may be substituted with an aryl group. In this case, examples of the aryl group may include 3,5-bis(1,1-dimethylethyl)-4-hydroxyphenyl group and the like, but the present invention is not limited thereto.

In Formula 3, $R^1$ may, for example, represent hydrogen, an alkyl group having 1 to 8 carbon atoms, or 1 to 4 carbon atoms, or an alkoxy group having 4 to 16 carbon atoms, or 4 to 12 carbon atoms. The alkyl group or the alkoxy group may be linear or branched, and may be substituted with one or more substituents.

In Formula 3, $R^2$, $R^3$ and P may each independently represent an alkyl group having 1 to 12 carbon atoms, 1 to 8 carbon atoms, or 1 to 4 carbon atoms. The alkyl group may be linear or branched, and may be substituted with one or more substituents.

In Formula 3, $R^4$ and $R^5$ may also be hydrogen.

Also, in Formula 3, L may, for example, represent an alkylene group having 4 to 12 carbon atoms or 6 to 10 carbon atoms or an alkylidene group having 2 to 10 carbon atoms or 4 to 8 carbon atoms. The alkylene group or the alkylidene group may be linear or branched, and may be substituted with one or more substituents.

Examples of the compound of Formula 3 may, for example, include bis(1,2,2,6,6-pentamethyl-4-piperidyl)sebacate, methyl 1,2,2,6,6-pentamethyl-4-piperidyl sebacate, propanedioic acid 2-[[3,5-bis(1,1-dimethylethyl)-4-hydroxyphenyl]methyl]-2-butyl-1,3-bis(1,2,2,6,6-pentamethyl-4-piperidinyl) ester, bis(2,2,6,6-tetramethyl-4-piperidyl)sebacate, or bis(1-octyloxy-2,2,6,6-tetramethyl-4-piperidinyl)sebacate, but the present invention is not limited thereto.

The compound of Formula 3 may be, for example, included at a content of 0.01 parts by weight to 10 parts by weight, 0.05 parts by weight to 10 parts by weight, 0.05 parts by weight to 8 parts by weight, 0.05 parts by weight to 6 parts by weight, or 0.05 parts by weight to 5 parts by weight, based on 100 parts by weight of the polymer in the pressure-sensitive adhesive composition. Within this content range, the pressure-sensitive adhesive composition, which effectively prevents occurrence of radicals by decomposition of the alkylene oxide chain or condensation of the hydroxyl group-containing monomers, and thus exhibits excellent storage stability, may be provided.

The pressure-sensitive adhesive composition may further include a cross-linking agent. The cross-linking agent may react with a cross-linking point of the polymer to realize a cross-linked structure.

For example, an aliphatic isocyanate cross-linking agent may be used as the cross-linking agent. When such a cross-linking agent reacts with the polymer, that is, a polymer including two or more hydroxyl group-containing monomers, to realize a cross-linked structure, a pressure-sensitive adhesive having desired antistatic characteristics as well as proper low-speed and high-speed peel strengths may be realized. For example, a cross-linking agent including an aliphatic cyclic isocyanate compound and/or an aliphatic non-cyclic isocyanate compound may be used as the cross-linking agent. As such, the term "aliphatic cyclic isocyanate compound" refers to an isocyanate compound having a ring structure, wherein the ring structure does not belong to an aromatic ring. For example, the aliphatic non-cyclic isocyanate compound may refer to an aliphatic linear or branched isocyanate compound. As such, examples of the aliphatic cyclic isocyanate compound may, for example, include an isocyanate compound such as isophorone diisocyanate, methylene dicyclohexyl diisocyanate, or cyclohexane diisocyanate; a derivative such as a dimer or a trimer of the isocyanate compound; or a reaction product of the isocyanate compound and a polyol (for example, trimethylolpropane), and examples of the aliphatic non-cyclic isocyanate compound may include an alkylene diisocyanate compound having 1 to 20 carbon atoms, 1 to 16 carbon atoms, 1 to 12 carbon atoms, or 1 to 8 carbon atoms, such as hexamethylene diisocyanate, a derivative such as a dimer or a trimer of the alkylene diisocyanate compound, or a reaction product of the alkylene diisocyanate compound and a polyol (for example, trimethylolpropane), but the present invention is not limited thereto.

As such, when the aliphatic cyclic isocyanate compound and the aliphatic non-cyclic isocyanate compound are used together, ratios of the aliphatic cyclic isocyanate compound and the aliphatic non-cyclic isocyanate compound are not particularly limited, and may be properly selected, when necessary. Typically, the aliphatic non-cyclic isocyanate compound may be included at a content of approximately 1 parts by weight to 500 parts by weight, or approximately 20 parts by weight to 300 parts by weight in the cross-linking agent, based on 100 parts by weight of the aliphatic cyclic isocyanate compound. Commercially available cross-linking agents may be used as such a cross-linking agent, that is, a cross-linking agent including the aliphatic cyclic isocyanate compound and the aliphatic non-cyclic isocyanate compound. Examples of the cross-linking agent may include MHG-80B and Duranate P commercially available from Asahi Kasei Chemicals Corp. and NZ-1 commercially available from BAYER AG.

When another cross-linking agent is required in addition to the above-described cross-linking agent, a known cross-linking agent such as a metal chelate cross-linking agent, which is a compound in which an epoxy cross-linking agent such as ethylene glycol diglycidylether, triglycidylether, trimethylolpropane triglycidylether, N,N,N',N'-tetraglycidyl ethylenediamine, or glycerine diglycidylether; an aziridine cross-linking agent such as N,N'-toluene-2,4-bis(1-aziridine carboxamide), N,N'-diphenylmethane-4,4'-bis(1-aziridine carboxamide), triethylene melamine, bisisophthaloyl-1-(2-methylaziridine), or tri-1-aziridinylphosphine oxide; or a polyvalent metal such as aluminum, iron, zinc, tin, titanium, antimony, magnesium and/or vanadium coordinated with acetyl acetone or ethyl acetoacetate, may be used together as the cross-linking agent.

The pressure-sensitive adhesive composition may include the cross-linking agent at 0.01 to 10 parts by weight, 0.1 to 10 parts by weight, 1 to 10 parts by weight, 2 to 10 parts by weight, 3 to 10 parts by weight, 4 to 10 parts by weight, or 4 parts by weight to 9 parts by weight, based on 100 parts by weight of the polymer. Within this content range, a proper cross-linked structure may be realized, and the low-speed and high-speed peel strengths of the pressure-sensitive adhesive may be adjusted to a desired extent.

The pressure-sensitive adhesive composition may further include an antistatic agent. For example, an ionic compound may be used as the antistatic agent.

A metal salt may be, for example, used as the ionic compound. The metal salt may, for example, include an alkali metal cation or an alkaline earth metal cation. Examples of the cation may include one or two or more of a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion (Me), a calcium ion ($Ca^{2+}$), a strontium ion ($Sr^{2+}$), and a barium ion ($Ba^{2+}$). For example, one or two or more of the lithium ion, the sodium ion, the potassium ion, the magnesium ion, the calcium ion and the barium ion may be used as the cation. In this case, the lithium ion may be used in consideration of ionic stability and mobility.

Examples of an anion included in the ionic compound may include $PF_6^-$, $AsF^-$, $NO_2^-$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-toluenesulfonate ($CH_3C_6H_4SO_3^-$), tetraborate ($B_4O_7^{2-}$), carboxybenzenesulfonate ($COOH(C_6H_4)SO_3^-$), trifluoromethanesulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$), or trispentafluoroethyl trifluorophosphate ($P(C_2F_5)_3F_3^-$).

According to another exemplary embodiment, an anion represented by the following Formula 5, or bis(fluorosulfonyl) imide may be used as the anion.

[Formula 5]

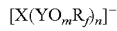

In Formula 5, X represents a nitrogen atom or a carbon atom, Y represents a carbon atom or a sulfur atom, $R_f$ represents a perfluoroalkyl group, m is 1 or 2, and n is 2 or 3.

In Formula 5, m may be 1 when Y is carbon, m may be 2 when Y is sulfur, n may be 2 when X is nitrogen, and n may be 3 when X is carbon.

The anion of Formula 5 or the bis(fluorosulfonyl) imide has high electronegativity due to the presence of a perfluoroalkyl group ($R_f$) or a fluoro group, and also has a unique resonance structure. Thus, the anion of Formula 5 or the bis(fluorosulfonyl) imide forms a weak bond with the cation, and simultaneously exhibits hydrophobicity. Therefore, the ionic compound may exhibit excellent compatibility with the other components of the composition, such as polymers, and also give high antistatic properties even when used at a small amount.

$R_f$ of Formula 5 may be a perfluoroalkyl group having 1 to 20 carbon atoms, 1 to 12 carbon atoms, 1 to 8 carbon atoms, or 1 to 4 carbon atoms. In this case, the perfluoroalkyl group may have a linear, branched or cyclic structure. The anion of Formula 5 may be a sulfonyl methide-based anion, a sulfonyl imide-based anion, a carbonyl methide-based anion, or a carbonyl imide-based anion. Specifically, the anion of Formula 5 may include tristrifluoromethanesulfonyl methide, bistrifluoromethanesulfonyl imide, bisperfluorobutanesulfonyl imide, bispentafluoroethanesulfonyl imide, tristrifluoromethanecarbonyl methide, bisperfluorobutanecarbonyl imide, or bispentafluoroethanecarbonyl imide, which may be used alone or in combination.

For example, an organic salt, which includes a quaternary ammonium, phosphonium, pyridinium, imidazolium, pyrolidinium, or piperidinium together with the anion components, may be used as the ionic compound, for example, a cation. Here, examples of the quaternary ammonium may include N-ethyl-N,N-dimethyl-N-propylammonium, N,N,N-trimethyl-N-propyl ammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium, or N-ethyl-N,N,N-trioctylammonium, and the metal salt and the organic salt may be used together, when necessary.

In the pressure-sensitive adhesive composition, the content of the ionic compound is not particularly limited. For example, the ionic compound may be present at a content of 0.01 parts by weight to 5 parts by weight, based on 100 parts by weight of the polymer. The content of the ionic compound may vary in consideration of desired antistatic properties, or compatibility between the components.

The pressure-sensitive adhesive composition may further include a silane coupling agent. Examples of the coupling agent may include gamma ($\gamma$)-glycidoxypropyl triethoxy silane, $\gamma$-glycidoxypropyl trimethoxy silane, $\gamma$-glycidoxypropyl methyldiethoxy silane, $\gamma$-glycidoxypropyl triethoxy silane, 3-mercaptopropyl trimethoxy silane, vinyltrimethoxysilane, vinyltriethoxy silane, $\gamma$-methacryloxypropyl trimethoxy silane, $\gamma$-methacryloxy propyl triethoxy silane, $\gamma$-aminopropyl trimethoxy silane, $\gamma$-aminopropyl triethoxy silane, 3-isocyanato propyl triethoxy silane, $\gamma$-acetoacetatepropyl trimethoxysilane, $\gamma$-acetoacetatepropyl triethoxy silane, $\beta$-cyanoacetyl trimethoxy silane, $\beta$-cyanoacetyl triethoxy silane, and acetoxyaceto trimethoxy silane, which may be used alone or in combination. For example, it is desirable that a silane coupling agent containing an acetoacetate group or a $\beta$-cyanoacetyl group is used as the silane coupling agent. The silane coupling agent may be included at a content of 0.01 parts by weight to 5 parts by weight or 0.01 parts by weight to 1 part by weight in the pressure-sensitive adhesive composition, based on 100 parts by weight of the polymer. Within this content range, an effect of properly improving pressure-sensitive adhesiveness, and durability and reliability may be ensured.

Also, the pressure-sensitive adhesive composition may further include a tackifier in an aspect of controlling the pressure-sensitive adhesiveness. Examples of the tackifier may include a hydrocarbon-based resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, or a polymerized rosin ester resin, which may be used alone or in combination. The tackifier may be included at a content of 1 part by weight to 100 parts by weight in the composition, based on 100 parts by weight of the copolymer. Within this content range, a proper addition effect and an effect of improving compatibility and cohesiveness may be ensured.

The pressure-sensitive adhesive composition may further include at least one additive selected from the group consisting of a coordination compound capable of forming a coordinate bond with the antistatic agent, a photoinitiator, a multifunctional acrylate, an epoxy resin, a cross-linking agent, a UV stabilizer, an antioxidant, a toning agent, a reinforcing agent, a filler, an antifoaming agent, a surfactant, and a plasticizer without affecting the effects of this application.

The pressure-sensitive adhesive composition may have a low-speed peel strength of approximately 1 gf/25 mm to 40 gf/25 mm, 1 gf/25 mm to 35 gf/25 mm, 1 gf/25 mm to 30 gf/25 mm, 1 gf/25 mm to 25 gf/25 mm, or 1 gf/25 mm to 20 gf/25 mm, and a high-speed peel strength of approximately 10 gf/25 mm to 180 gf/25 mm with respect to an adherend having a surface energy of 30 mN/m or less in a state in which the cross-linked structure is realized.

As such, the term "low-speed peel strength" may, for example, refer to a peel strength measured at a peel angle of 180° and a peel rate of 0.3 m/min, and the term "high-speed peel strength" may refer to a peel strength measured at a peel angle of 180° and a peel rate of 30 m/min.

Specifically, each of the peel strengths may be measured at the above-described peel angle and peel rate after a pressure-sensitive adhesive composition whose cross-linked structure is realized is attached to an adherend having a surface energy of 30 mN/m or less, and then kept at a temperature of 23° C. and a relative humidity of 65% for 24 hours. A specific method of measuring each of the peel strengths will be described in the following Examples.

As such, a method of measuring the surface energy of the adherend is not particularly limited. For example, the surface energy of the adherend may be measured using a known method of measuring the surface energy. In this case, a contact angle of the adherend may be measured, and the surface energy may be calculated from the contact angle, or the surface energy may be measured using a known surface energy measuring machine. The surface energy of the adherend may, for example, be in a range of approximately 10 m/N/m to 30 mN/m.

For the pressure-sensitive adhesive composition, a ratio (H/L) of the high-speed peel strength (H) to the low-speed peel strength (L) may also be in a range of 1 to 30, 1 to 25, 1 to 20, 5 to 20, or 7 to 20.

Also, the pressure-sensitive adhesive composition may have an electrostatic discharge (ESD) voltage of 0.7 kV, which occurs when the pressure-sensitive adhesive composition is peeled from the adherend, that is, an adherend having a surface energy of 30 mN/m or less, at a peel angle of 180° and a peel rate of 40 m/min in a state in which the cross-linked structure is realized. A method of measuring the ESD voltage will be described in the following Examples.

When the low-speed peel strength, the high-speed peel strength, and/or the ESD voltage are ensured as described above, the pressure-sensitive adhesive composition may be peeled from the adherend at a high speed while exhibiting a proper protective function to the adherend and minimizing generation of static electricity, etc.

Also, the present invention is directed to providing a pressure-sensitive adhesive sheet. For example, the pressure-sensitive adhesive sheet may be a protective film, particularly a protective film for optical elements.

For example, the pressure-sensitive adhesive sheet may be used as a protective film for optical elements, such as a polarizing plate, a polarizer, a polarizer protective film, a retardation film, a viewing angle-compensating film, a brightness-improving film, and the like. In this specification, the terms "polarizer" and "polarizing plate" refer to distinct subjects. That is, the polarizer refers to a film, a sheet or an element showing a polarizing function per se, and the polarizing plate refers to an optical element including another component together with the polarizer. Examples of the component that may be included in the optical element together with the polarizer may include a polarizer protective film or a retardation layer, but the present invention is not limited thereto.

The pressure-sensitive adhesive sheet may, for example, include a base film for surface protection, and a pressure-sensitive adhesive layer disposed at one side of the base film. For example, the pressure-sensitive adhesive layer may include the pressure-sensitive adhesive composition, such as a cross-linked pressure-sensitive adhesive composition, that is a pressure-sensitive adhesive composition whose cross-linked structure is realized.

The pressure-sensitive adhesive composition has a relatively high low-speed peel strength and a relatively low high-speed peel strength after formation of a cross-linked structure, and also shows an excellent balance between the low-speed and high-speed peel strengths, and superior durability and reliability, workability, transparency and antistatic properties. Therefore, the protective film may be effectively used as a surface protective film for protecting surfaces of optical elements, such as a polarizing plate, a retardation plate, an optical compensation film, a reflective sheet, and a brightness-improving film, all of which are used for various optical devices or parts thereof, or display devices or parts thereof, for example, liquid crystal displays (LCDs), but the present invention is not limited to the use of the protective film.

Typical films or sheets known in the related art may be used as the base film for surface protection. For example, the base film for surface protection may include a polyester film such as polyethylene terephthalate, or polybutylene terephthalate, or a plastic film such as a polytetrafluoroethylene film, a polyethylene film, a polypropylene film, a polybutene film, a polybutadiene film, a poly(vinyl chloride) film, or a polyimide film. Such a film may be formed in a single-layer structure or a structure in which at least two layers are stacked. Optionally, the film may further include a functional layer such as an antifouling layer or an antistatic layer. Also, one or both surfaces of the base film may be subjected to surface treatment such as primer treatment in an aspect of improving base adhesion.

The thickness of the base film may be properly determined according to applications, but the present invention is not limited thereto. Typically, the base film may be formed to have a thickness of 5 μm to 500 μm, or 10 μm to 100 μm.

The thickness of the pressure-sensitive adhesive layer included in the pressure-sensitive adhesive sheet is not particularly limited, but may, for example, be in a range of 2 μm to 100 μm or 5 μm to 50 μm.

A method of forming a pressure-sensitive adhesive layer is not particularly limited. For example, the pressure-sensitive adhesive layer may be formed by coating a base film with a pressure-sensitive adhesive composition or a coating solution prepared from the pressure-sensitive adhesive composition using a conventional tool such as a bar coater, and curing the pressure-sensitive adhesive composition or the coating solution, or by primarily coating a surface of a detachable base with a pressure-sensitive adhesive composition or a coating solution, curing the pressure-sensitive adhesive composition or the coating solution, and then transferring the pressure-sensitive adhesive composition or the coating solution to a base film.

The method of forming a pressure-sensitive adhesive layer may be preferably performed after bubble-forming components such as volatile components or residual reaction products are sufficiently removed from the pressure-sensitive adhesive composition or the coating solution. As a result, it is possible to prevent the modulus of elasticity from being degraded due to extremely low cross-linking density or molecular weight of the pressure-sensitive adhesive, and also prevent scatterers from being formed in bubbles when the bubbles increasingly occur between a glass plate and a pressure-sensitive adhesive layer under a high-temperature condition.

Also, in such a method, a process of curing a pressure-sensitive adhesive composition is not particularly limited. For example, the pressure-sensitive adhesive composition may be cured by subjecting the pressure-sensitive adhesive composition to a proper aging process so that the polymer and the cross-linking agent in the composition can react with each other, or may be cured by irradiation with light, for example irradiation with UV rays, which can induce an activation of an photoinitiator in the composition.

For example, the pressure-sensitive adhesive layer may have a gel content of approximately 80% to 99%. The gel content may, for example, be calculated by Equation 1.

$$\text{Gel content} = B/A \times 100 \qquad \text{[Equation 1]}$$

In Equation 1, A represents a mass of the pressure-sensitive adhesive, and B represents an insoluble dry mass collected after the pressure-sensitive adhesive is deposited in ethyl acetate at room temperature for 48 hours.

Also, the present invention is directed to providing an optical element. The optical element according to one exemplary embodiment may include an optical element, and the pressure-sensitive adhesive sheet is attached to a surface of the optical element. For example, the pressure-sensitive adhesive layer of the pressure-sensitive adhesive sheet is attached to the surface of the optical element, and thus the optical element may be protected by the base film for surface protection.

Examples of the optical element included in the optical element may, for example, include a polarizer, a polarizing plate, a polarizer protective film, a retardation layer, or a viewing angle-compensating layer.

As such, typical types of polarizers known in the related art, for example, polyvinyl alcohol polarizers, may be used as the polarizer without limitation.

The polarizer is a functional film or a sheet that can extract light vibrating in one direction from incident light while vibrating in various directions. For example, such a polarizer may have a structure in which a dichroic dye is adsorbed onto and then aligned on a polyvinyl alcohol-based resin film. The polyvinyl alcohol-based resin constituting the polarizer may be, for example, obtained by gelling a polyvinyl acetate-based resin. In this case, the polyvinyl acetate-based resin that may be used herein may include vinyl acetate, and a copolymer of other monomers copolymerizable with the vinyl acetate, as well as a homopolymer of vinyl acetate. As such, examples of the monomer copolymerizable with the vinyl acetate may include unsaturated carboxylic acids, olefins, vinyl ethers, unsaturated sulfonic acids, and acrylamides containing ammonium groups, which may be used alone or in combination, but the present invention is not limited thereto. Typically, the polyvinyl alcohol-based resin may have a degree of gelation of approximately 85 mole % to 100 mole %, preferably 98 mole % or more. The polyvinyl alcohol-based resin may be further modified. For example, polyvinyl formal or polyvinyl acetal modified with an aldehyde may be used. Also, the polyvinyl alcohol-based resin may typically have a degree of polymerization of approximately 1,000 to 10,000, preferably approximately 1,500 to 5,000.

A film may be formed using the polyvinyl alcohol-based resin, and used as a disk film for polarizers. A method of forming a film from the polyvinyl alcohol-based resin is not particularly limited. For example, a film may be formed from the polyvinyl alcohol-based resin using a conventional method known in the related art. The thickness of the disk film formed from the polyvinyl alcohol-based resin is not particularly limited. For example, the disk film may be properly controlled within a thickness of 1 µm to 150 µm. In this case, the disk film may be controlled to a thickness of 10 µm or more in consideration of ease of elongation. The polarizer may be prepared through a process of elongating (for example, uniaxially elongating) the above-described polyvinyl alcohol-based resin film, a process of staining the polyvinyl alcohol-based resin film with a dichroic dye and adsorbing the dichroic dye, a process of treating the polyvinyl alcohol-based resin film onto which the dichroic dye is adsorbed with an aqueous boric acid solution, a process of treating the polyvinyl alcohol-based resin film with a dichroic dye and washing the polyvinyl alcohol-based resin film, etc. As such, iodine or a dichroic organic dye may be used as the dichroic dye.

The polarizing plate may include, for example, the polarizer, and another optical film(s) attached to one or both sides of the polarizer. As such, examples of the optical film(s) may include the polarizer protective film, the retardation layer, the viewing angle-compensating layer, or the anti-glare layer as described above.

As such, the polarizer protective film is differentiated from a protective film including the pressure-sensitive adhesive layer, and thus is a protective film for protecting the polarizer. For example, the polarizer protective film may be formed as a multilayer film obtained by staking protective films including a cellulose-based film such as triacetyl cellulose; an acrylic film; a polyester-based film such as a polycarbonate film, or a polyethylene terephthalate film; a polyethersulfone-based film; and/or a polyolefin-based film such as a polyethylene film, a polypropylene film, a polyolefin film having a cyclo-based or norbornene structure, or an ethylene propylene copolymer. Also the thickness of the protective film is not particularly limited. For example, the protective film may be formed to have a typical thickness.

In the optical element, a surface the optical element protected by the protective film may have a surface energy of approximately 30 mN/m or less. For example, a surface-treated layer may be present on a surface of the optical element. In this case, the surface-treated layer may have a surface energy of 30 mN/m or less. That is, the surface of the optical element protected by the protective film in the optical element may have a surface energy of approximately 30 mN/m or less, and thus the protective film may be attached to the surface of the optical element. According to another exemplary embodiment, a surface-treated layer having this surface energy may be formed on a surface of the optical element, and the pressure-sensitive adhesive layer of the protective film may be attached to the surface-treated layer.

Examples of the surface-treated layer may include a glare shielding layer such as a high-hardness layer, an anti-glare (AG) layer or a semi-glare (SG) layer, or a low reflective layer such as an anti-reflection (AR) layer or a low reflection (LR) layer.

The high-hardness layer may be a layer having a pencil hardness of 1H or more or 2H or more at a load of 500 g. The pencil hardness may be, for example, measured according to the ASTM D 3363 standard using pencil leads prescribed in KS G 2603.

The high-hardness layer may be, for example, a resin layer having high hardness. The resin layer may, for example, include a room-temperature-curable, moisture-curable, thermosetting, or active energy ray-curable resin composition in a cured state. According to one exemplary embodiment, the resin layer may include a thermosetting or active energy ray-curable resin composition, or an active energy ray-curable resin composition in a cured state. In description of the high-hardness layer, the term "cured state" may refer to a state in which components included in each resin composition are subjected to a cross-linking reaction or a polymerization reaction to convert the resin composition into a hard state. As such, the room-temperature-curable, moisture-curable, thermosetting, or active energy ray-curable resin composition may also refer to a composition whose cured state may be induced at room temperature or induced in the presence of proper moisture or by application of heat or irradiation with active energy rays.

A variety of resin compositions which can satisfy this range of pencil hardness when the resin compositions are in a cured state are known in the related art, and thus suitable resin compositions may be readily selected by a person of ordinary skill in the art.

According to one exemplary embodiment, the resin composition may include an acrylic compound, an epoxy compound, a urethane-based compound, a phenolic compound, or a polyester compound as a major component. As such, the term "compound" may be a monomeric, oligomeric or polymeric compound.

According to one exemplary embodiment, an acrylic resin composition showing excellent optical properties such as transparency and superior yellowing resistance, for example, an active energy ray-curable acrylic resin composition, may be used as the resin composition.

For example, the active energy ray-curable acrylic composition may include an active energy ray-polymerizable polymer component and a reactive diluting monomer.

Examples of the polymer component may include a component widely known in the related art as an active energy ray-polymerizable oligomer, such as urethane acrylate, epoxy acrylate, ether acrylate or ester acrylate, or a polymerization product of a mixture including a monomer such as a (meth)acrylic ester monomer. As such, examples of the (meth)acrylic ester monomer may include an alkyl (meth)acrylate, a (meth)acrylate having an aromatic group, a heterocyclic (meth)acrylate, or an alkoxy (meth)acrylate. A variety of polymer components used to prepare the active energy ray-curable composition are known in the related art, and the above-described compounds may be selected, when necessary.

Examples of the reactive diluting monomer that may be included in the active energy ray-curable acrylic composition may include a monomer having one or two or more active energy ray-curable functional groups, for example, acryloyl groups or (meth)acryloyl groups. For example, the (meth)acrylic acid ester monomer or the multifunctional acrylate may be used as the reactive diluting monomer.

A method of selecting the components used to prepare the active energy ray-curable acrylic composition, and a blending ratio of the selected components are not particularly limited, and may be adjusted in consideration of a desired hardness and other physical properties of the resin layer.

For example, the glare shielding layer such as an AG or SG layer may include a resin layer having an uneven surface formed therein, and a resin layer including particles. In this case, another resin layer including particles having a different refractive index than the particles of the resin layer may also be used.

As such, a resin layer used to form the high-hardness layer may be, for example, used as the resin layer. When the glare shielding layer is formed, the components of the resin composition may not necessarily be adjusted so that the resin layer can surely show high hardness, but the resin layer may be formed so that the resin layer can show the high hardness.

As such, a method of forming an uneven surface on a resin layer is not particularly limited. For example, the uneven structure may be realized by curing the resin composition while bringing a coating layer of the resin composition into contact with a mold having a desired uneven structure, or by blending particles having suitable particle sizes with a resin composition and coating and curing the resin composition.

The glare shielding layer may also be formed using particles having a different refractive index than the resin layer.

According to one exemplary embodiment, the particles may, for example, have a difference in refractive index of 0.03 or less or 0.02 to 0.2 with respect to the resin layer. When the difference in refractive index is extremely small, it is difficult to induce haze. On the other hand, when the difference in refractive index is extremely high, scattering in the resin layer may often cause an increase in haze, and light transmittance or contrast characteristics may be degraded. Therefore, the particles may be properly selected in consideration of these facts.

The shape of the particles included in the resin layer is not particularly limited. For example, the particles may have a spherical, oval, polyhedral or amorphous shape, or other shapes. The particles may have an average diameter of 50 nm to 5,000 nm. According to one exemplary embodiment, particles having an uneven surface formed therein may be used as the particles. Such particles may, for example, have an average surface roughness (Rz) of 10 nm to 50 nm or 20 nm to 40 nm, and/or a maximum height of protrusions formed on the particle surfaces may be in a range of approximately 100 nm to 500 nm or 200 nm to 400 nm, and a width between the protrusions may be in a range of 400 nm to 1,200 nm or 600 nm to 1,000 nm. Such particles are highly compatible with the resin layer and show excellent dispersibility in the resin layer.

Examples of the particles may include various inorganic or organic particles. Examples of the inorganic particles may include silica, amorphous titania, amorphous zirconia, indium oxide, alumina, amorphous zinc oxide, amorphous cerium oxide, barium oxide, calcium carbonate, amorphous barium titanate, or barium sulfate, and examples of the organic particles may include particles including a cross-linked or non-cross-linked product formed of an organic material such as an acrylic resin, a styrene resin, a urethane resin, a melamine resin, a benzoguanamine resin, an epoxy resin, or a silicon resin, but the present invention is not limited thereto.

The uneven structure formed in the resin layer or the content of the particles is not particularly limited. For example, in the case of the AG layer, the shape of the uneven structure or the content of the particles may be adjusted so that a haze value of the resin layer may be in a range of approximately 5% to 15%, 7% to 13%, or approximately 10%, and, in the case of the SG layer, the shape of the uneven structure or the content of the particles may be adjusted so that a haze value of the resin layer may be in a range of approximately 1% to 3%. For example, the haze value may be measured according to the manufacturer's manual using a hazemeter such as HR-100 or HM-150 (commercially available from SEPUNG).

The low reflective layer such as an AR or LR layer may be formed by coating a low refractive index material. Low refractive index materials which may be used to form the low reflective layer are widely known in the related art, and all of the low refractive index materials may be properly selected and used in the optical element. The low reflective layer may be formed through coating of the low refractive index material so that the low reflective layer can have a reflectivity of approximately 1% or less.

To form the surface-treated layer, materials known in Korean Unexamined Patent Application Publication Nos. 2007-0101001, 2011-0095464, 2011-0095004, 2011-0095820, 2000-0019116, 2000-0009647, 2000-0018983, 2003-0068335, 2002-0066505, 2002-0008267, 2001-0111362, 2004-0083916, 2004-0085484, 2008-0005722, 2008-0063107, 2008-0101801 and 2009-0049557 may also be used.

The surface-treated layer may be formed of the known materials, either alone or in combination. Examples of the combination may include a case in which a high-hardness layer is first formed on a surface of a base layer and a low-reflection layer is then formed on a surface of the high-hardness layer.

Further, the present invention is directed to providing a display device, for example, an LCD device. The display device according to one exemplary embodiment may include a liquid crystal panel, and the optical element(s) may be attached to one or both surfaces of the liquid crystal panel. For example, the film may be attached to the liquid crystal panel using an adhesive or a pressure-sensitive adhesive. As such, the adhesive or pressure-sensitive adhesive is another adhesive or a pressure-sensitive adhesive in addition to the pressure-sensitive adhesive present in the above-described protective film.

Types of the liquid crystal panel included in the liquid crystal display device are not particularly limited. For example, all types of known panels, for example, various passive matrix panels such as a twisted neumatic (TN) panel, a super-twisted neumatic (STN) panel, a ferroelectric (F) panel, and a polymer-dispersed (PD) panel; various active matrix panels such as a two-terminal panel and a three-terminal panel; an in-plane switching (IPS)-mode panel, and a vertical alignment (VA)-mode panel, may be used, but the present invention is not limited thereto. Also, the types of other components included in the liquid crystal display device, and a method of preparing the same are not also particularly limited. For example, the typical components known in the related art may be used without limitation.

Advantageous Effects

The pressure-sensitive adhesive sheet formed using the pressure-sensitive adhesive composition according to one exemplary embodiment of the present invention can have proper low-speed and high-speed peel strengths and simultaneously exhibit an excellent balance between the low-speed and high-speed peel strengths. The pressure-sensitive adhesive sheet formed using the pressure-sensitive adhesive composition according to one exemplary embodiment of the present invention exhibits a proper level of surface resistance and excellent electrostatic discharge characteristics, and has no contaminants with respect to an adherend even when the pressure-sensitive adhesive sheet is peeled from the adherend after the pressure-sensitive adhesive sheet is attached to the adherend for a long period of time. Such a pressure-sensitive adhesive sheet formed using the pressure-sensitive adhesive composition according to one exemplary embodiment of the present invention can be applied to various fields of applications. For example, the pressure-sensitive adhesive sheet can be used as a protective film for optical members such as polarizing plates.

DETAILED DESCRIPTION OF EXEMPLARY EMBODIMENTS

Hereinafter, the pressure-sensitive adhesive composition will be described in detail with reference to the following Examples and Comparative Examples. However, it should be understood that the description proposed herein is just a preferable example for the purpose of illustrations only, not intended to limit the scope of the invention.

1. Measurement of Surface Resistance

A pressure-sensitive adhesive sheet was cut into pieces having a width of 150 mm and a length of 50 mm, and a release poly(ethylene terephthalate) (PET) film was peeled from a pressure-sensitive adhesive layer at a constant rate. Thereafter, three arbitrary points were determined on a surface of the release PET film or the pressure-sensitive adhesive layer from which the release PET film was peeled off, the surface resistance was measured at the three arbitrary points, and the average of the obtained surface resistance values was calculated. The surface resistance was measured according to the manufacturer's manual using a high-resistance resistance meter (MCP-HT 450 commercially available from Mitsubishi Chemical Corp.).

2. Measurement of Low-Speed Peel Strength

Each of the pressure-sensitive adhesive sheets prepared in the Examples and the Comparative Examples was attached to a glare shielding film (Trade Name: ASG5 commercially available from LG Chem. Ltd.) using a 2 kg roller according to the JIS Z 0237 standard. Thereafter, the glare shielding film to which the protective film was attached was cut to a width of 25 mm and a length of 100 mm to prepare test samples, and then kept at a temperature of 23° C. and a relative humidity of 65% for 24 hours. Then, peel strengths of the test samples were measured at room temperature using a tensile tester (Texture Analyzer commercially available from Stable Micro Systems Ltd.) while horizontally peeling each of the pressure-sensitive adhesive sheets from the glare shielding film at a peel angle of 180° and a peel rate of 0.3 m/min. The peel strength was determined by measuring two identical test samples in duplicate and averaging the measured values.

3. Measurement of High-Speed Peel Strength

Each of the pressure-sensitive adhesive sheets prepared in the Examples and the Comparative Examples was attached to a glare shielding film (Trade Name: ASG5 commercially available from LG Chem. Ltd.) using a 2 kg roller according to the JIS Z 0237 standard. Thereafter, the glare shielding film to which the protective film was attached was cut to a width of 25 mm and a length of 250 mm to prepare test samples, and then kept at a temperature of 23° C. and a relative humidity of 65% for 24 hours. Then, peel strengths of the test samples were measured at room temperature using a tensile tester (Texture Analyzer commercially available from Stable Micro Systems Ltd.) while horizontally peeling each of the pressure-sensitive adhesive sheets from the glare shielding film at a peel angle of 180° and a peel rate of 30 m/min. The peel strength was determined by measuring two identical test samples in duplicate and averaging the measured values.

4. Measurement of Electrostatic Discharge (ESD) Voltage

Each of the pressure-sensitive adhesive sheets prepared in the Examples and the Comparative Examples was cut to a width of 220 mm and a length of 250 mm. Thereafter, each of the cut pressure-sensitive adhesive sheets was attached to a glare shielding film (Trade Name: ASG5 commercially available from LG Chem. Ltd.) using a 2 kg roller according to the JIS Z 0237 standard. Then, each of the pressure-sensitive adhesive sheets was peeled from the glare shielding film at a temperature of 23° C., a relative humidity of 65%, a peel angle of 180°, and a peel rate of 40 m/min Immediately after peeling, ESD voltage was measured at a distance of 40 mm from a surface of the glare shielding film using an electrostatic potential analyzer (KSD-200). The ESD voltage was determined by measuring two identical test samples in duplicate and averaging the measured values. The evaluation criteria for ESD voltage were as follows.

<Evaluation Criteria for ESD Voltage>

A: ESD voltage is less than or equal to 0.5 kV

B: ESD voltage is greater than 0.5 kV

6. Evaluation of Contamination Level

Each of the pressure-sensitive adhesive sheets prepared in the Examples and the Comparative Examples was cut to a width of 150 mm and a length of 250 mm Thereafter, each of the cut pressure-sensitive adhesive sheets was attached to a glare shielding film (Trade Name: ASG5 commercially available from LG Chem. Ltd.) using a 2 kg roller according to the JIS Z 0237 standard. Then, a black pressure-sensitive adhesive film was attached to a surface of the glare shielding film to which the pressure-sensitive adhesive sheet was not attached, and kept at a temperature of 50° C. for 24 hours. Subsequently, a protective film was peeled, and bubbles were intentionally injected between the pressure-sensitive adhesive layer and the glare shielding film by repeatedly performing this attachment process. The resulting stacked body into which the bubbles were incorporated was again kept at room temperature for 24 hours. Then, the protective film was removed, and the presence of contaminants formed at a bubble position was checked by illuminating the glare shielding film with a Xenon HID lamp (commercially available from Polarion. Co., Ltd.). The contamination level was evaluated according to the following evaluation criteria.

<Evaluation Criteria for Contamination Level>

A: Contaminants are not observed

B: Contaminants are slightly observed

C: A large amount of contaminants are observed

Preparative Example 1: Preparation of Acrylic Copolymer A

2-Ethylhexyl acrylate (2-EHA), 4-hydroxybutyl acrylate (4-HBA), 2-hydroxyethyl acrylate (2-HEA), N,N-dimethyl acrylamide, and 2-(2-ethoxyethoxy)ethyl acrylate (EOEOEA) were put at a weight ratio of 86:3:3:4:4 (2-EHA: 4-HBA:2-HEA:DMAA:EOEOEA) into a 3-L reactor equipped with a cooling device to facilitate the reflux of nitrogen gas and easily adjust the temperature, and 100 parts by weight of ethyl acetate (EAc) was added, based on 100 parts by weight of the solid content of a monomer. Thereafter, the reactor was purged with nitrogen gas for an hour to remove oxygen, and then maintained at a temperature of 60° C. Then, a reaction initiator (azobisisobutyronitrile (AIBN)) and a molecular weight modifier (n-dodecyl mercaptan (n-DDM)) were put at a proper amount into the reactor, and reacted for approximately 8 hours. After the reaction, the reaction product was diluted with ethyl acetate (EAc) to prepare an acrylic copolymer A having a solid content of 44% by weight and a weight average molecular weight ($M_w$) of approximately 350,000.

Preparative Examples 2 to 15: Preparation of Acrylic Copolymers B to L

Acrylic copolymers were prepared in the same manner as in Preparative Example 1, except that the contents of the monomers used to prepare polymers were altered as listed in the following Tables 1 and 2.

TABLE 1

| | Preparative Examples | | | | | |
|---|---|---|---|---|---|---|
| | 1 | 2 | 3 | 4 | 5 | 6 |
| Polymer | A | B | C | D | E | F |
| 2-EHA | 86 | 83 | 80 | 78 | 87 | 55 |
| HBA | 3 | 3 | 3 | 3 | 3 | 3 |
| HEA | 3 | 6 | 6 | 15 | 3 | 3 |
| DMAA | 4 | 4 | — | — | 3 | 35 |
| EOEOEA | 4 | 4 | — | — | — | 4 |
| FM-401 | — | — | 11 | 4 | 4 | — |

Unit of proportion: part(s) by weight
2-EHA: 2-ethylhexylacrylate
HBA: 4-hydroxybutylacrylate
HEA: 2-hydroxyethylacrylate
DMAA: N,N-dimethylacrylamide
EOEOEA: 2-(2-ethoxyethoxy)ethyl acrylate
FM-401: polyethylene glycol monomethylether methacrylate (added ethylene oxide unit mole number: 9 moles)

TABLE 2

| | Preparative Examples | | | | | | |
|---|---|---|---|---|---|---|---|
| | 7 | 8 | 9 | 10 | 11 | 12 | 13 |
| Polymer | G | H | I | J | K | L | M |
| 2-EHA | 75 | 65 | 77 | 86 | 83 | 69 | 79 |
| HBA | 3 | 3 | 3 | 3 | 3 | 3 | 10 |
| HEA | 3 | 3 | 12 | 3 | 3 | 20 | 3 |
| DMAA | 15 | 25 | 4 | 4 | 4 | 4 | 4 |

TABLE 2-continued

| | Preparative Examples | | | | | | |
|---|---|---|---|---|---|---|---|
| | 7 | 8 | 9 | 10 | 11 | 12 | 13 |
| EOEOEA | 4 | 4 | 4 | — | 7 | 4 | 4 |
| EOEOEOEA | — | — | — | 4 | — | — | — |

Unit of proportion: part(s) by weight
2-EHA: 2-ethylhexylacrylate
HBA: 4-hydroxybutylacrylate
HEA: 2-hydroxyethylacrylate
DMAA: N,N-dimethylacrylamide
EOEOEA: 2-(2-ethoxyethoxy)ethyl acrylate
EOEOEOEA: 2-[2-(2-ethoxyethoxy)ethoxy]ethyl acrylate Example 1: Preparation of Pressure-Sensitive Adhesive Composition 6 parts by weight of a mixture of an isophorone diisocyanate-based cross-linking agent and a hexamethylene diisocyanate-based cross-linking agent (MHG-80B commercially available from Asahi Kasei Chemicals Corp.) as a cross-linking agent, 2 parts by weight of lithium bis(trifluoromethanesulfonyl)imide (LiTFSi), and 3 parts by weight of acetylacetone were also mixed homogeneously, based on 100 parts by weight of the acrylic polymer A prepared in Preparative Example 1. In consideration of coatability, the resulting mixture was then diluted to a proper concentration to prepare a pressure-sensitive adhesive composition.

Preparation of Pressure-Sensitive Adhesive Sheet

One surface of a PET film (thickness: 38 μm) was coated with the prepared pressure-sensitive adhesive composition, and dried to form a coating layer (i.e., a pressure-sensitive adhesive layer) having a uniform thickness of approximately 20 μm. Thereafter, a release PET film was stacked on the coating layer, and aged at approximately 50° C. for approximately 3 days to prepare a pressure-sensitive adhesive sheet (i.e., a protective film).

Examples 2 to 4 and Comparative Examples 1 to 8

Pressure-sensitive adhesive compositions were prepared in the same manner as in Example 1, except that the components and contents of the pressure-sensitive adhesive compositions were altered as listed in the following Tables 3 and 4.

TABLE 3

| | | Examples | | | | | | | |
|---|---|---|---|---|---|---|---|---|---|
| | | 1 | 2 | 3 | 4 | 5 | 6 | 7 | 8 |
| Polymer | Type | A | A | A | A | B | G | H | I |
| | Proportion | 100 | 100 | 100 | 100 | 100 | 100 | 100 | 100 |
| Cross-linking agent | Proportion | 6 | 7 | 6 | 7 | 5 | 7 | 8 | 6 |
| Metal A | Proportion | 2 | 1 | 1 | 1 | 1.5 | 2 | 2 | 2 |
| Metal B | Proportion | | | 0.5 | | | | | |
| Organic | Proportion | | | | 0.5 | | | | |

Unit of proportion: part(s) by weight

Cross-linking agent: Mixture of isophorone diisocyanate-based cross-linking agent and hexamethylenediisocyanate-based cross-linking agent (Asahi Kasei Chemicals Corp.)

Metal A: Lithium bis(trifluoromethanesulfonyl)imide (LiTFSi)

Metal B: PEL-20A (Japan Carlit Co., Ltd.)

Organic: Tributylmethyl ammonium bistrifluoromethane sulfonimide (3M)

TABLE 4

|  |  | Comparative Examples | | | | | | | | | |
|---|---|---|---|---|---|---|---|---|---|---|---|
|  |  | 1 | 2 | 3 | 4 | 5 | 6 | 7 | 8 | 9 | 10 |
| Polymer | Type | C | C | D | E | E | F | J | K | L | M |
|  | Proportion | 100 | 100 | 100 | 100 | 100 | 100 | 100 | 100 | 100 | 100 |
| Cross-linking agent | Proportion | 5 | 5 | 6 | 5 | 5.5 | 5 | 5 | 5 | 5 | 5 |
| Metal A | Proportion |  | 0.1 | 0.5 | 0.5 | 1 | 1 |  |  |  |  |
| Metal B | Proportion | 0.5 |  |  | 0.5 |  |  |  | 0.5 | 0.5 | 0.5 | 0.5 |
| Organic | Proportion | 0.5 |  |  | 1 |  |  |  | 0.5 | 0.5 | 0.5 | 0.5 |

Unit of proportion: part(s) by weight
Cross-linking agent: Mixture of isophorone diisocyanate-based cross-linking agent and hexamethylenediisocyanate-based cross-linking agent (Asahi Kasei Chemicals Corp.)
Metal A: Lithium bis(trifluoromethanesulfonyl)imide (LiTFSi)
Metal B: PEL-20A (Japan Carlit Co., Ltd.)
Organic: Tributylmethyl ammonium bistrifluoromethane sulfonimide (3M)

Physical properties of the respective pressure-sensitive adhesive compositions prepared in Examples and Comparative Examples were evaluated. The evaluation results are summarized and listed in the following Tables 5 and 6.

TABLE 5

|  | Examples | | | | | | | |
|---|---|---|---|---|---|---|---|---|
|  | 1 | 2 | 3 | 4 | 5 | 6 | 7 | 8 |
| Surface resistance | 2 | 3.1 | 2.7 | 2.4 | 2.1 | 2.3 | 2.1 | 2.2 |
| L-peel | 6.3 | 4.5 | 2.6 | 5.4 | 7.0 | 10.7 | 15.6 | 10.2 |
| H-peel | 65 | 51 | 46 | 62 | 80 | 121 | 178 | 111 |
| H/L | 10.3 | 11.3 | 17.7 | 11.5 | 11.4 | 11.3 | 11.4 | 10.9 |
| ESD | A | A | A | A | A | A | A | A |
| Contamination | A | A | A | A | A | A | A | A |

L-peel: Low-speed peel strength (unit: gf/25 mm)
H-peel: High-speed peel strength (unit: gf/25 mm)
H/L: Ration of high-speed peel strength (H) and low-speed peel strength (L)
ESD: ESD voltage
Surface resistance: Surface resistance ($\times 10^{11}$) of pressure-sensitive adhesive (unit: $\Omega/\square$)

TABLE 6

|  | Comparative Examples | | | | | | | | | |
|---|---|---|---|---|---|---|---|---|---|---|
|  | 1 | 2 | 3 | 4 | 5 | 6 | 7 | 8 | 9 | 10 |
| Surface resistance | 0.55 | 3.2 | 2.6 | 0.76 | 1.8 | 1.9 | 2.1 | 1.8 | 2.9 | 2.6 |
| L-peel | 2.7 | 4.7 | 7.1 | 4.4 | 4.9 | 15 | 5.4 | 3.8 | 17.2 | 9.3 |
| H-peel | 56 | 77 | 92 | 53 | 70 | 223 | 61 | 59 | 198 | 116 |
| H/L | 20.7 | 16.4 | 13 | 12.1 | 14.3 | 14.9 | 11.3 | 15.5 | 14.8 | 12.5 |
| ESD | A | A | A | A | A | B | A | B | A | B |
| Contamination | C | C | C | C | B | B | C | B | C | B |

L-peel: low-speed peel strength (Unit: gf/25 mm)
H-peel: high-speed peel strength (Unit: gf/25 mm)
H/L: Ratio of high-speed peel strength (H) and low-speed peel strength (L)
ESD: ESD voltage
Surface resistance: Surface resistance ($\times 10^{11}$) of pressure-sensitive adhesive (unit: $\Omega/\square$)

As listed in Tables 5 and 6, it was revealed that the pressure-sensitive adhesive sheets prepared in the Examples had proper low-speed and high-speed peel strengths and simultaneously exhibited an excellent balance between the low-speed and high-speed peel strengths. Also, it was revealed that the pressure-sensitive adhesive layers exhibited excellent surface resistance and high ESD voltage, and had no contaminants with respect to the adherend when each of the pressure-sensitive adhesive sheets were peeled from the adherend.

On the other hand, it could be seen that the balance between the low-speed and high-speed peel strengths was poor, and the adherend was severely contaminated when a large amount of the monomer having a high added ethylene oxide unit mole number was used in the case of Comparative Examples 1 and 2.

Also, it could be seen that the adherend was contaminated when the monomer having a high added ethylene oxide unit mole number was included in the polymer in the case of Comparative Example 3.

In addition, it could be seen that the adherend was severely contaminated when the monomer having a high added ethylene oxide unit mole number was used in the case of Comparative Examples 4 and 5. Also, it was revealed that a large amount of the nitrogen-containing reactive compound was used, and thus the high-speed peel strength was very low, and increased contamination of the adherend and an increase in ESD voltage were observed in the case of Comparative Example 6.

Further, it was confirmed that the adherend was severely contaminated in the case of Comparative Example 7 even when the composition was prepared under the same conditions as in Example 1, except for a slight difference in added ethylene oxide unit mole numbers of the monomers. Also, it was confirmed that the peel strengths highly increased at the same time that the contamination of the adherend increased to a high level in the case of Comparative Examples 8 and 9, and that simultaneous increases in the peel strengths and the ESD voltage, and increased contamination of the adherend were observed in the case of Comparative Example 10.

The invention claimed is:

1. A surface protective film comprising:
a base layer for surface protection; and
a pressure sensitive adhesive layer formed on one or both surfaces of the base layer and comprising a pressure sensitive adhesive composition in a cross-linked state,
wherein the pressure-sensitive adhesive composition comprises:
a polymer comprising 2 to 5 parts by weight of a compound represented by Formula 1; 1 to 25 parts by weight of a dialkyl (meth)acrylamide containing an alkyl having 1 to 4 carbon atom(s); 1 to 15 parts by weight of a first monomer and 1 to 5 parts by weight of a second monomer as monomer components,
wherein the first monomer is represented by Formula 2 in which the number of carbon atoms of alkylene groups A and B is from 1 to 3, and wherein the second monomer is represented by Formula 2 in which the number of carbon atoms of alkylene groups A and B is from 4 to 8, and wherein a ratio (A/B) of a weight (A) of the first monomer and a weight (B) of the second monomer is in a range of 1 to 5; and
an ionic compound,
wherein the pressure sensitive adhesive layer has a ratio (H/L) of a high speed peel-off strength (H) to a low speed peel-off strength (L) of 1 to 20, wherein the low speed peel-off strength (L) is measured at a peel angle of 180° and a peel rate of 0.3 m/min with respect to an adherend having a surface energy of 30 mN/m or less and the high speed peel-off strength (H) is measured at a peel angle of 180° and a peel rate of 30 m/min with respect to an adherend having a surface energy of 30 mN/m or less:

[Formula 1]

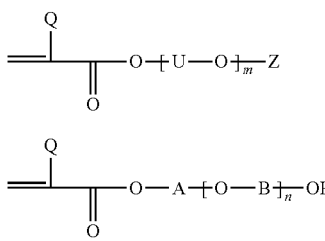

[Formula 2]

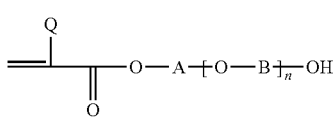

wherein Q represents hydrogen or an alkyl group, U represents an alkylene group having 1 to 4 carbon atom(s), Z represents hydrogen, or an alkyl group having 1 to 4 carbon atom(s), m is a number ranging from 1 to 2, and n is 0.

2. The surface protective film of claim 1, wherein the pressure-sensitive adhesive composition further comprises an aliphatic isocyanate cross-linking agent.

3. The surface protective film of claim 2, wherein the aliphatic isocyanate cross-linking agent comprises at least one selected from the group consisting of an aliphatic cyclic isocyanate compound and an aliphatic non-cyclic isocyanate compound.

4. The surface protective film of claim 3, wherein the aliphatic cyclic isocyanate compound comprises isophorone diisocyanate, methylene dicyclohexyl diisocyanate, or cyclohexane diisocyanate, a dimer or trimer of the isocyanate compound, or a reaction product of the isocyanate compound and a polyol.

5. The surface protective film of claim 3, wherein the aliphatic non-cyclic isocyanate compound comprises at least one selected from the group consisting of an alkylene diisocyanate compound having 1 to 20 carbon atoms, a dimer or trimer of the isocyanate compound, and a reaction product of the isocyanate compound and a polyol.

6. The surface protective film of claim 2, wherein the aliphatic isocyanate cross-linking agent is included at a content of 0.01 parts by weight to 10 parts by weight, based on 100 parts by weight of the polymer in the pressure sensitive adhesive composition.

7. The surface protective film of claim 1, wherein the low speed peel-off strength (L) is in a range of 1 gf/25 mm to 40 gf/25 mm.

8. The surface protective film of claim 1, wherein the high speed peel-off strength (H) is in a range of 10 gf/25 mm to 180 gf/25 mm.

9. The surface protective film of claim 1, wherein the surface protective film is detachably attached on a surface to be protected.

10. An optical element having the surface protective film of claim 1 detachably attached to a surface thereof.

11. The optical element of claim 10, wherein a surface energy of the surface of the optical element to which the surface protective film is attached is less than or equal to 30 mN/m.

12. A display device comprising the optical element defined in claim 10.

* * * * *